Feb. 18, 1930. F. A. SEIBERLING 1,747,652
METHOD AND MACHINE FOR PRODUCING BIAS STRIPS
Filed Oct. 2, 1926 10 Sheets-Sheet 1

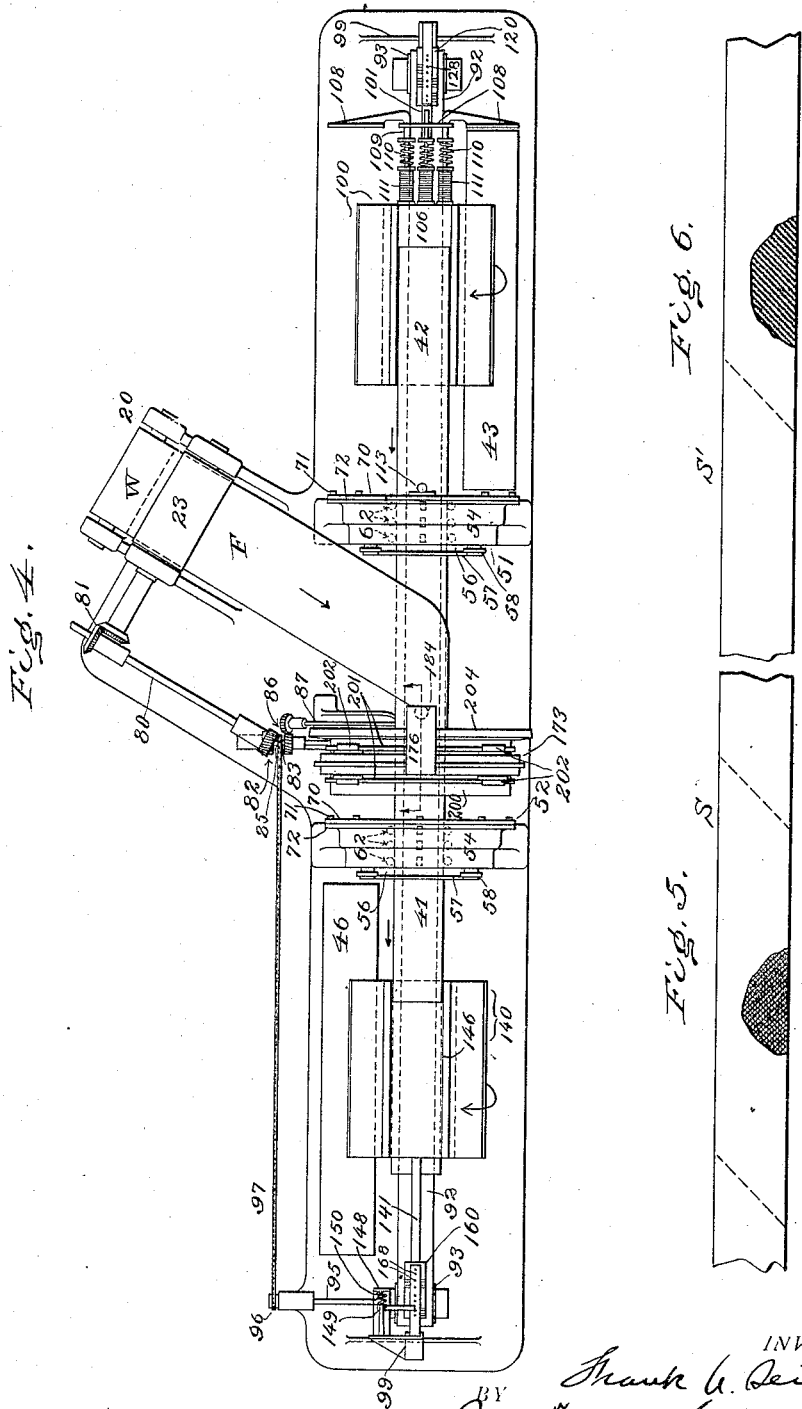

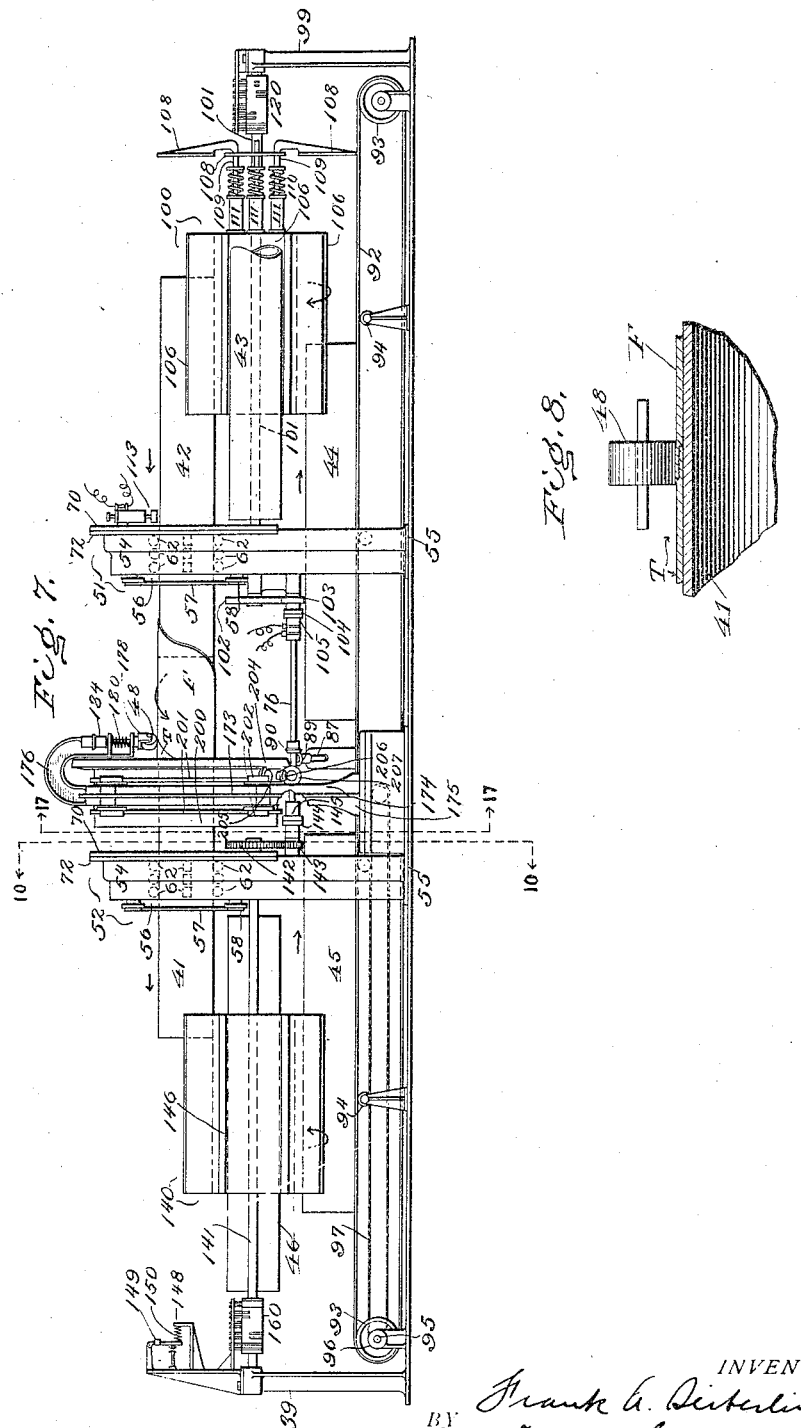

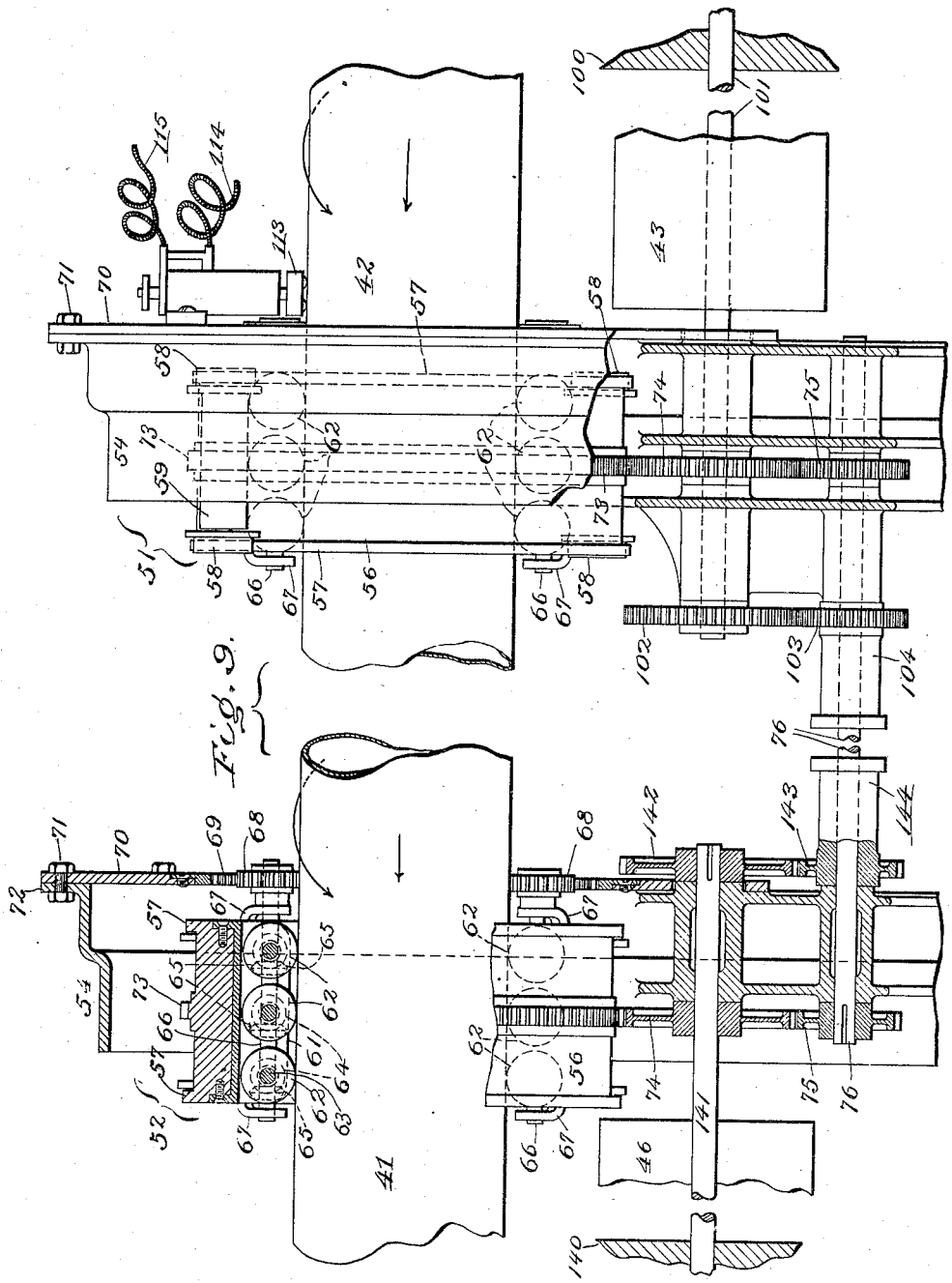

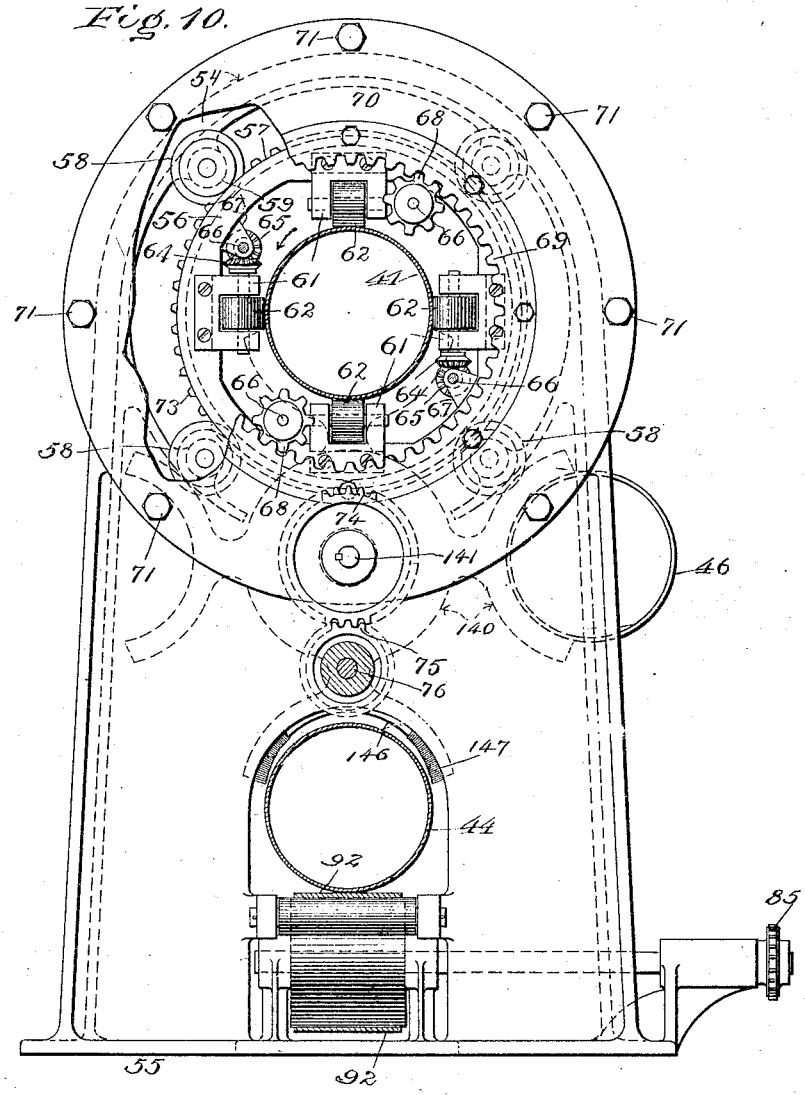

Feb. 18, 1930.  F. A. SEIBERLING  1,747,652
METHOD AND MACHINE FOR PRODUCING BIAS STRIPS
Filed Oct. 2, 1926  10 Sheets-Sheet 7
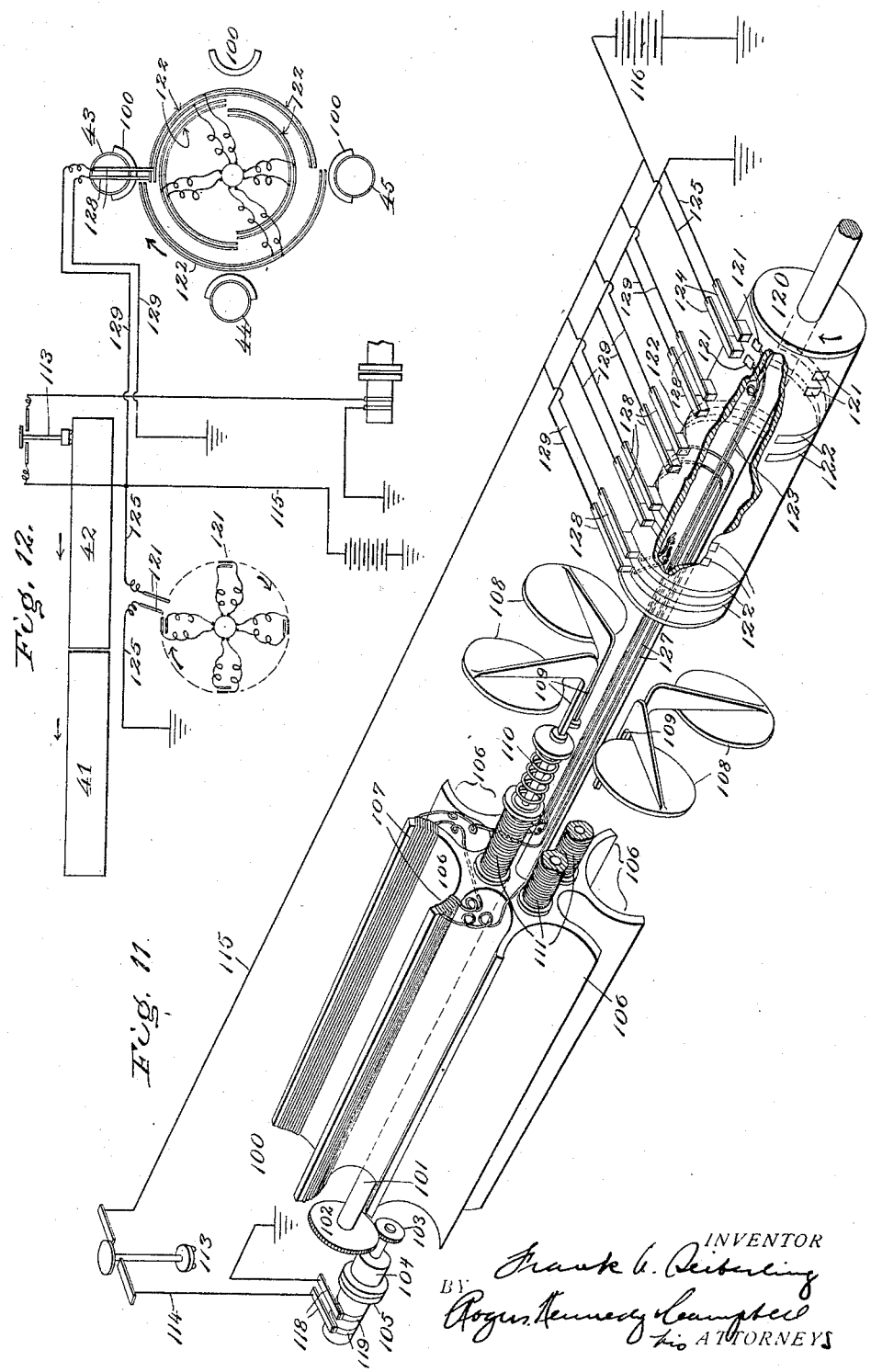
INVENTOR
Frank A. Seiberling
BY
Rogers, Kennedy, Campbell
his ATTORNEYS Feb. 18, 1930.  F. A. SEIBERLING  1,747,652
METHOD AND MACHINE FOR PRODUCING BIAS STRIPS
Filed Oct. 2, 1926  10 Sheets-Sheet 8
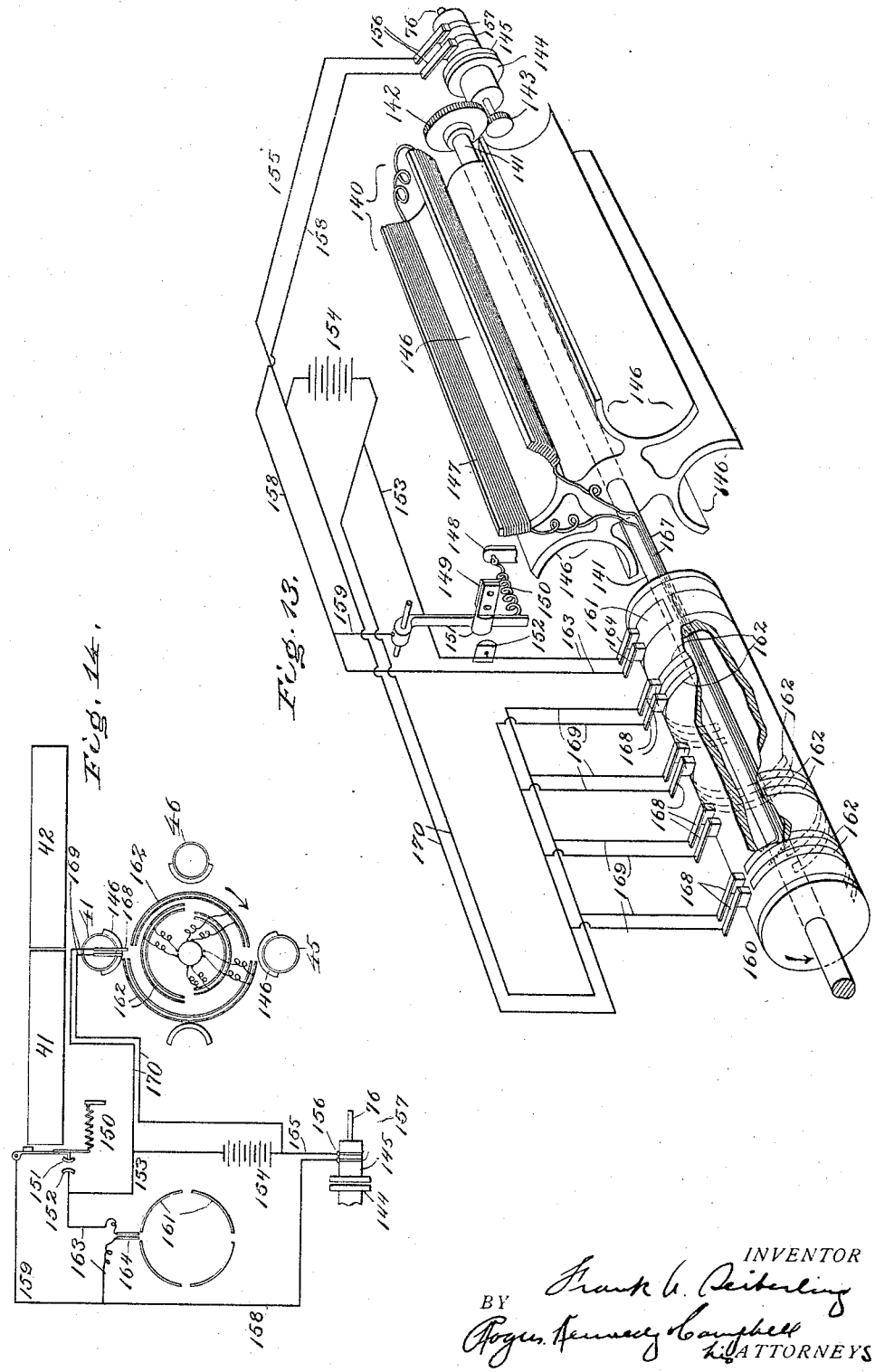
INVENTOR
Frank A. Seiberling
BY
Rogers, Kennedy Campbell
ATTORNEYS Feb. 18, 1930.  F. A. SEIBERLING  1,747,652
METHOD AND MACHINE FOR PRODUCING BIAS STRIPS
Filed Oct. 2, 1926  10 Sheets-Sheet 9
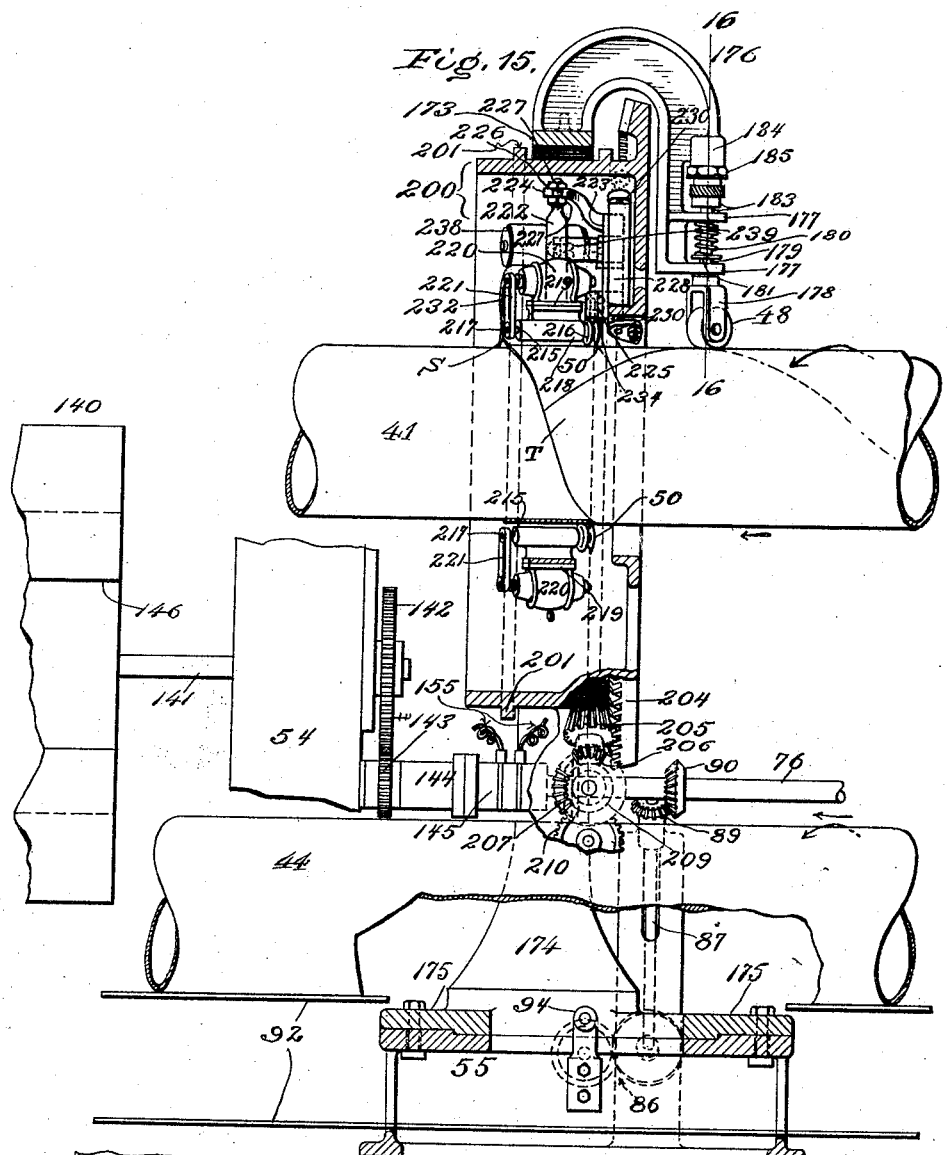
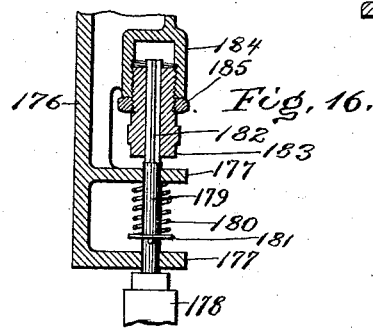
INVENTOR
BY Frank A. Seiberling
Rogers Kennedy Campbell
his ATTORNEYS

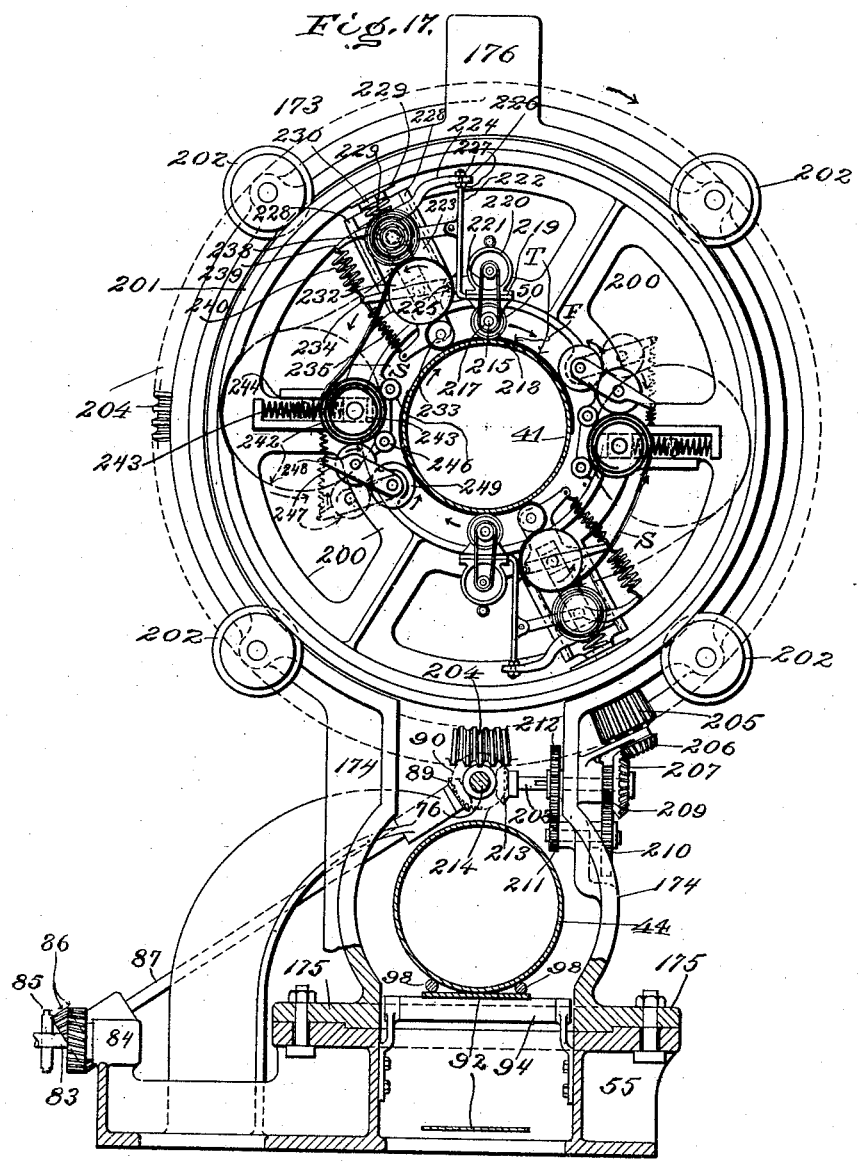

Patented Feb. 18, 1930

1,747,652

UNITED STATES PATENT OFFICE

FRANK A. SEIBERLING, OF AKRON, OHIO

METHOD AND MACHINE FOR PRODUCING BIAS STRIPS

Application filed October 2, 1926. Serial No. 139,028.

This invention relates to method and machine for producing bias strips, and has reference more especially to the manufacturing of fabric strips or plies such as are used in building tire casings, hose, or analogous articles. The invention provides for the performance of a succession of progressive steps or operations constituting a continuous as distinguished from an interrupted method, and carried out by synchronized elements of apparatus constituting an automatic machine.

In outline, the successive operations as carried out in the complete embodiment herein disclosed are, first, what may be termed the rubberizing operation resulting in the progressive production of rubberized (or similarly treated) fabric in the form of a wide strip or web, which will be referred to as the rubberized fabric; second, the helical winding or wrapping of the treated web or fabric into a tubular shape preferably upon a supporting form or mandrel toward which the fabric is advanced continuously at a proper angle from the fabric supply or rubberizing apparatus; third, the splicing or uniting of the wound fabric into a tube, preferably by compression upon the gummed or overlapping contiguous edges of the successive convolutions; fourth, the bias cutting of such rubberized fabric tube into the final desired strips or plies, preferably at an angle of approximately 45°, or within 10° thereof, to the warp or longitudinal threads or cords of the fabric; and fifth, the final taking up or winding into receiving rolls or bolts of the strip or strips of bias ply so produced. This succession of steps and means is considered to be novel as a whole, and as to each subordinate sequence or combination thereof, as well as to each individual step and the means of carrying it out.

In my prior Patent 1,309,424 of 1919 a bias strip apparatus is shown wherein a single cord is handled, being wound from a spool closely upon each of a number of mandrels, and overlaid by a gum layer, these actions being started by hand, and the procedure being discontinuous, the rotation stopping when each mandrel is full, the cord end being then cut by hand and the mandrel shifted to a new location, where by hand it is slowly turned while a hand knife is manipulated to cut and strip the resulting fabric diagonally from the mandrel. The operation requires skill and attention, and produces only short lengths of unspliced bias cut cord fabric. I am aware of a suggestion for making bias fabric wherein rubberized stock is to be fed from a stock roll and wrapped in tube form upon a non-rotating drum, but wherein the stock roll has to be carried bodily around the axis as it supplies the fabric, the drum receiving the fabric at 45° and feeding the helical tube longitudinally forward by numerous endless belts traveling along the drum surface, and the issuing tube being collapsed and flattened into a double ply strip, or else longitudinally slit into a plurality of strips which will have a bias angle the same as the pitch angle of the helix. This plan in its essential mode of supplying the stock, and of in wrapping and advancing the helix, prohibits combining the rubberizing with the wrapping, splicing, or bias cutting in a single apparatus.

The prevailing method of making bias plies is substantially a hand method, although involving certain apparatus. It is believed that the rubberizing of fabric has not heretofore been combined with either the splicing or the bias cutting in a single or continuous method or apparatus. The usual practice of making the plies is substantially as follows. The rubberized fabric, previously produced and placed in stock, is fed out from the roll either vertically downwards or horizontally on conveying belts. This drawing off of the stock fabric is intermittent, the fabric being brought to rest after a given length of feed, and while at rest a diagonal shearing means or a traveling knife is employed to sever a diagonal length or section of ply or strip. These loose ply lengths are removed and transferred by hand to a splicing table, where successive lengths or sections are alined, gummed and united by hand into the final product. It is found that such bias plies are not cut with any uniform accuracy of width, and it has been necessary to allow a tolerance, with substantial waste of material resulting.

Additionally this practice involves high labor cost, human hazard, and large floor space, as well as substantial expense in constant inspection of the varying product.

The general objects of the present invention are to afford a method and machine for producing bias cut strips which will overcome the drawbacks inherent in heretofore known and prevailing practices with which I am acquainted, and which will be automatic and continuous in action, and capable of increased speed and output, while at the same time efficient and accurate in operation and results and convenient and safe in practical use. Other and further objects and advantages of the present invention will be explained in the hereinafter following description of an illustrative embodiment thereof or will be apparent to those skilled in the subject.

To the attainment of such objects and advantages the present invention consists in the novel method of and machine for producing bias cut strips, and the novel features of operation, construction, arrangement, combination and detail herein illustrated or described.

In the accompanying drawings Fig. 1 is a diagrammatic perspective view of an embodiment, indicating the principal mechanical elements of the apparatus and the disposition of the fabric as it passes through the machine; this embodiment showing the fabric or stock as being rubberized by a roller means or calender.

Fig. 4 is a general top plan view of a complete apparatus or machine embodying the present invention and using the rubberizing system of Fig. 1.

Fig. 5 is a face view of a portion of bias cut strip or ply produced by the method and machine of Figs. 1 and 4.

Fig. 6 is a face view showing the product when using the alternative rubberizing system of Figs. 2 and 3.

Fig. 7 is a front elevation of the machine shown in Fig. 4.

Fig. 8 is an elevation and section indicating the mode of splicing or uniting the overlapping edges of the wrapped fabric or web.

Fig. 9 is an enlarged view partly in front elevation and partly in central longitudinal section of the first and second mandrel operating mechanisms, with the intermediate part of the machine omitted.

Fig. 10 is a right elevation, partly in section on the line 10—10 of Fig. 7, of the second or left hand mandrel operating mechanism.

Fig. 11 is a perspective view of the mechanism and control means for infeeding mandrels or mandrel sections to the first mandrel operating mechanism.

Fig. 12 is a diagrammatic view of the controlling circuits for the mandrel infeeding mechanism.

Fig. 13 is a perspective view of the mechanism and control means for outfeeding or receiving the discharged mandrels from which the fabric has been bias cut and removed.

Fig. 14 is a diagrammatic view of the controlling circuits for the mandrel outfeeding or receiving mechanism.

Fig. 15 is an enlarged view partly in front elevation and partly in central longitudinal section of the bias cutting mechanism.

Fig. 16 is a detail, showing the splicing roll mounting, in section on the line 16—16 of Fig. 15.

Fig. 17 is a right elevation of the bias cutting mechanism, partly in section on the line 17—17 of Fig. 7.

Figure 1:
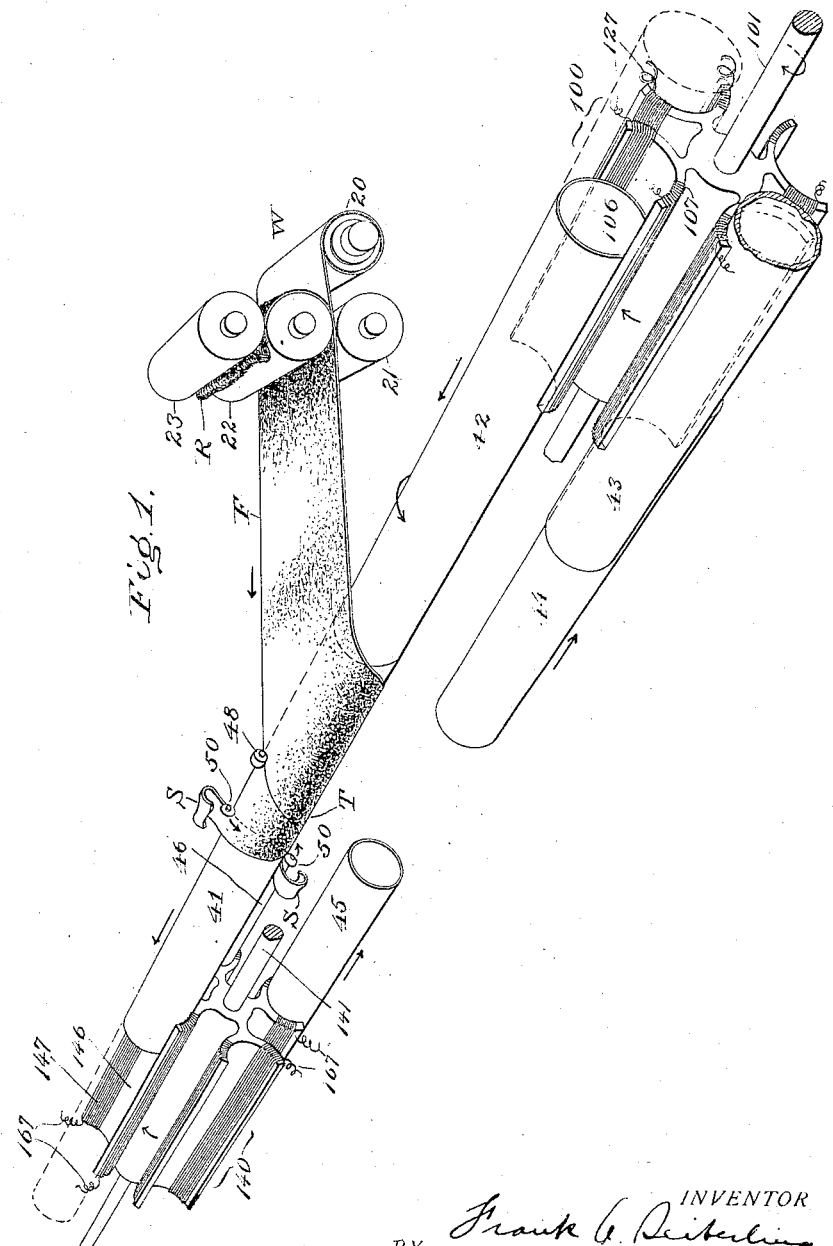

Referring first to Fig. 1 the process starts with the woven fabric W supplied from a stock roll 20. This is advanced and rubberized in an apparatus or calender comprising thin shelled rolls suitably heated and cooled in any known manner, and driven in synchronism with the succeeding mechanisms. There are shown rolls 21 and 22 through which the fabric is advanced and a third roll 23 by which the rubber or gummy material R is spread evenly over the second roll and thence applied to the fabric, producing the rubberized fabric F, which is shown traveling directly from the rubberizing step to the winding, splicing and bias cutting operations. The rubberized fabric advances from the fixed location of the supply or rubberizing means and approaches at a suitable angle to the wrapping mechanism so as to form a wound helix, preferably with a slight overlap, the convolutions being spliced by adhesion of the overlap, or by a butt joint, preferably with an added gum strip, into a progressively advancing tube T. The fabric tube is preferably thereupon diagonally cut or slit into one or a plurality of bias strips or plies S, along lines extending at 45°, more or less, to the spliced seam or line of junction of the fabric, or the length of the web or its warp elements.

Figure 2:
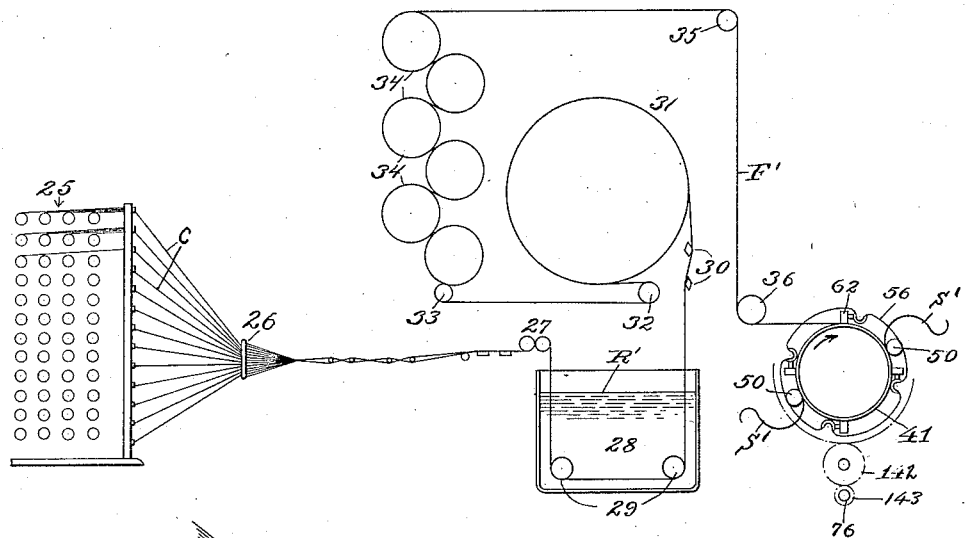
Fig. 2 is a diagrammatic left elevation of an alternative mode of producing the rubberized fabric, to be conducted to the wrapping and bias cutting devices analogously to Fig. 1; this embodiment indicating the production of an unwoven type of rubberized fabric by the assembling of cords and causing the assemblage to be impregnated or rubberized by suitable material such as latex.
Figure 3:
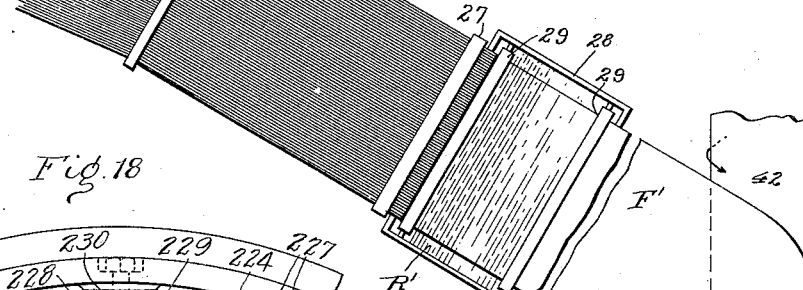
Fig. 3 is a diagrammatic top plan view of the apparatus shown in Fig. 2, with certain portions omitted.

Referring to Figs. 2 and 3 a series of cords C are shown as being delivered from a creel 25, the individual cords being threaded through a thread board 26 from which they pass along in contact with suitable guiding or positioning means and between a pair of rolls 27 to a vessel 28 containing the treating material, such as rubber latex R'. The cords, preferably in touching contact, are carried through the tank and underneath guide rolls 29 and thence upwardly from the vessel and through suitable guiding means, including doctor blades 30 which prevent an excessive quantity of rubber passing along with the now rubberized fabric F'. The fabric is then passed over a large rotating drying drum 31 from which it is shown traveling to and over guide rolls 32 and 33 to a series of small drying rolls or ironing drums 34. From the drying rolls the fabric passes over guide rolls 35 and 36 and then travels at the desired pitch angle to the wrapping, splicing and cutting mechanisms, which are suitably positioned for this purpose.

When woven fabric is employed, as indicated in Fig. 1, the resulting bias ply or strip S may be as indicated in Fig. 5, with the warp and weft threads standing at opposite diagonals. When the rubberized fabric consists of parallel cords impregnated and consolidated into a web as in Figs. 2 and 3 the product may be the bias strip S' as shown in Fig. 6, with only diagonal cords. Other rubberized fabrics could be employed, comprising for example a system of warp cords held together by occasional binding threads or wefts, or superposed layers of cords, or a double thickness of woven fabric.

In any case rubberized fabric web F is caused to travel toward the wrapping or winding mechanism at an angle of approach equal to the pitch angle of the wrapping helix. The winding or wrapping is effected upon a mandrel and the resulting fabric tube is continuously advanced lengthwise during its formation, splicing and cutting into strips. In the travel of the tube from the winding point to the cutting point it is also preferably rotated. For this purpose the receiving mandrel or its supporting surface is continuously rotated during the operations. The mandrel is also preferably advanced longitudinally, at least at its surface, and preferably bodily. To permit its continuous bodily advance the mandrel is preferably divided into a series of mandrels or sections which are successively infed to the wrapping point and outfed beyond the cutting point and thence recirculated back to the infeed point. Thus there is illustrated a series of six circulating mandrels. The fabric tube T is actually engaged on what will be termed the first mandrel 41. This and the other mandrels may consist of thin walled tubes, for example of iron in case the circulation is controlled by magnetic means as herein illustratively described, otherwise of aluminum. The mandrel diameter is such that its circumference will bear a definite interrelation to the width of the stock and the helix pitch angle. Thus the width of the stock less any overlap allowed for splicing, divided by the circumference of the mandrel should give the sine of the helix angle. If the angle be about 30° as shown and the fabric 56 inches wide, the mandrel should have a circumference of about 112 inches or diameter of about 35½ inches, and the resulting tube may be cut into two bias plies or strips each about 14½ inches wide with their edges at about 45° to the length of the original fabric or the warp elements thereof. Obvious modification of dimensions will give any desired width of strip.

The first mandrel 41 is shown in Figs. 1, 3, 4, 7 and 9 as being rotated and advanced lengthwise by the second operating mechanisms, and as having traveled into partial engagement with the outfeeding devices, and wholly so in Figs. 12 and 14. The second mandrel 42 is shown as immediately following the first mandrel and being rotated and advanced in synchronism with it by the first operating mechanism, and as still in partial engagement with the infeeding devices, except in Figs. 12 and 14 where it has become wholly disengaged. The third mandrel 43 has not yet been placed in alinement with the preceding ones but is shown engaged with the infeeding mechanism to be described. The fourth mandrel 44 is shown traveling reversely into engagement with the infeeding mechanism. The fifth mandrel 45 is shown still engaged in the outfeeding mechanism, but about to be transferred back to the infeeding mechanism. The sixth mandrel 46 is shown as having been received at the outfeeding mechanism and shifted out of alinement with the active mandrels 41 and 42, but not yet in position for the reverse feeding. The described system of circulating mandrels dispenses with the need of complication of mandrel construction otherwise necessary to enable the advance of the tube relatively to the mandrel.

The splicing means by which successive convolutions are united into a progressively formed fabric tube is shown diagrammatically in Figs. 1 and 3 as comprising a presser or roller 48 which is arranged, as will be described, to exert a splicing pressure upon the overlapping or gummed edges of the rubberized fabric. If preferred the fabric edges may be merely abutted and allowed to adhere, or supplied with a gum strip extending across the juncture.

Following the splicing, whatever means or method is employed, is the cutting or strip forming mechanism and this is indicated in Figs. 1, 2 and 3 as comprising a blade or rotary cutting disk 50, or preferably a plurality of them, so located and operated as to cut slits and divide the fabric tube into plies or strips, the cut standing at an angle of about 45°, or between 35° and 55°, to the longitudinal dimension of the original fabric web. While the cutting blades 50 might, by proper arrangement, be substantially fixed in position they are herein shown as being carried revolubly around so that in conjunction with the movements of the mandrel and fabric tube a relative helical cutting path on the tube is produced, this helix preferably trending in the opposite direction to that of the longitudinal or warp elements of the rubberized fabric, and at about 45° thereto as stated.

The mandrel operating mechanisms are best shown in Figs. 4, 7, 9 and 10 and they serve to rotate each mandrel and preferably simultaneously to advance it so that each portion of the surface of the mandrel travels helically in agreement with the already described preferably advancing movements of the fabric tube. In order to enable a succession of mandrels to be circulated through the machine there are shown two of the actuating mechanisms, the first mechanism 51 located at a point in advance of the wrapping point at which the mandrels receive the fabric, and the second actuating mechanism 52 located beyond the point at which the fabric tube is cut into strips and the strips diverted to the takeup means. The two mandrel actuators 51 and 52 are shown spaced apart a distance slightly less than the length of a single mandrel so that each mandrel after being infed into the first actuator, is rotated and advanced, receiving fabric, and having the fabric cut from it in strips, then engaging the second actuator before disengaging the first, then disengaging the first actuator as the succeeding mandrel follows along in contacting succession with it. Fig. 9 shows the first actuator mechanism 51 in elevation and the second one 52 partly in central section, while Fig. 10 is a right elevation of the second mechanism partly in section on the line 10—10 of Fig. 7. The two mechanisms being substantially alike the same description will apply to both.

Each mandrel actuating mechanism is contained within a fixed arched standard or housing 54 upstanding from a general base 55. Within the upper arched portion of each standard 54 is shown a revolving carriage or rotor 56 through which the mandrels are rotated. The rotor 56 is generally cylindrical and has outward end flanges or tracks 57, engaging upon a system of four pairs of flanged guide rolls 58 mounted in bearings 59 secured at suitable points within the arch 54.

The mandrels are engaged by each carriage through longitudinal rolls referred to as pinch rolls, the mandrel being held between them and advanced by their rotation. Thus each carriage is shown as having a system of forked brackets 61 extending inwardly and carrying rolls 62 adapted to engage directly against the periphery of the mandrel. There are shown four sets of these pinch rolls, with three in each set, thus giving a firm grip upon the mandrel and holding it accurately in alinement. The bodily rotation of the pinch roll carriage 56 serves to rotate the mandrel while the longitudinal advance is effected by the rotation of some or all of the pinch rolls. For the latter purpose the three shafts 63 of the individual pinch rolls in each set are shown provided with bevel pinions 64, these engaging corresponding bevel pinions 65 fast on a longitudinal shaft 66 mounted in ears 67 standing inwardly from the carriage, so that by rotating the shaft 66 the several pinch rolls will be rotated in unison. A simple mode of actuating all four sets of pinch rolls in unison is through pinions 68 mounted at the ends of the four shafts 66, all of these pinions running in a planetary manner along the teeth of an internal gear 69, which is preferably a fixed gear interchangeably attached upon a circular plate 70 which is connected by bolts 71 with the flange 72 of the arch or housing 54. As the carriage 56 turns counterclockwise in Fig. 10 the several pinions 68 in unison are rotated clockwise with their shafts 66, thereby rotating the 12 pinch rolls in a direction to advance the mandrel as it rotates, the described gearing being such as to give the proper ratio between the rotary and advancing movements so as to result in a helical advance corresponding with that of the fabric helix applied to the mandrel. In case of different widths of fabric or strip, and different angle of helix, it is only necessary to change the pinions 68 and gear 69 for others of different ratio.

The rotation of the rotor or carriage 56 may be effected by power in synchronism with other mechanisms for convenience as follows. A gear 73, or a set of gear teeth, is mounted or formed on the exterior of each of the carriages. The gear 73 is shown engaged by an intermediate gear 74 turning loosely on a convenient shaft or axle, and the gear 74 engages a gear 75 fixed on a longitudinal shaft 76, so that rotation of shaft 76 turns the carriage and thereby rotates and advances the mandrel. The shaft 76 runs continuously and extends through from the first to the second of the mandrel actuating mechanisms, operating both of them, and as shown in Fig. 9 the connections are substantially symmetrical.

The power connections may at this point be advantageously described. The prime or power shaft 80 is shown in Fig. 4. A pair of bevel pinions 81 transmits the power to the calender rolls, having such ratio as to operate the rolls at the proper speed to feed the fabric F to the rotating mandrels. A pair of helical gears 82 communicates the rotation to a short cross shaft 83, seen also in Fig. 17, this shaft mounted in a bearing 84. A second pair of helical gears 86 transmits the rotation to an upwardly inclined shaft 87, which may be interrupted if desired to interpose a speed change gearing. The upper end of the inclined shaft 87 carries a bevel pinion 89 meshing with a bevel pinion 90 mounted on the longitudinal shaft 76, whereby the power is transmitted to the two mandrel actuating mechanisms as described, in synchronism with the fabric rubberizing mechanism.

The mandrel circulating mechanism is indicated in Fig. 1 and shown more fully in Figs. 4, 7 and 9 to 14. In general this mechanism comprises an outfeeding device receiving the mandrels discharged from the second actuating mechanism 52, and carrying each mandrel laterally out of the path of the succeeding one, in combination with a reversely moving conveyor which receives each mandrel from the outfeeding device and conveys it to the infeeding device, which in turn carries the mandrel from the return conveyor, places it in alinement with the preceding active mandrel and delivers to it an initial advancing thrust movement into engagement with the first mandrel actuating mechanism 51. The return conveyor may conveniently consist of a belt 92 mounted near the base on end pulleys 93, with several intermediate pulleys or supports 94 to prevent undue sagging, the shaft of one of the pulleys 93 carrying a sprocket wheel 96, the same driven through a sprocket chain 97, extending from the power driven sprocket wheel 85 mounted on shaft 83. Figs. 4 and 7 indicate the return carrier reversely conveying the mandrel 45 from the outfeeding devices and conveying the mandrel 44 into the infeeding devices, where it is brought to a stop in correct position by the lowermost of the thruster devices 108 yet to be described. The mandrel in traveling between the infeeding and outfeeding devices may be retained by rails or rods 98 from rolling off the conveyor belt 92, as shown in Fig. 17.

Referring to the mandrel infeeding mechanism, supported largely by a post 99, this comprises a suitable carrier in the nature of a spider 100, having receptacles adapted to receive and hold the mandrels and transfer them from the conveyor 92 to a position in alinement with the active mandrels, together with a device for thrusting each mandrel forwardly into operative engagement with the first actuating mechanism 51. Any suitable means may be employed to enable the carrier or spider to grasp and retain each mandrel during transfer and then release it; and for convenience magnetic means are indicated.

The infeeding spider or carrier 100 is shown as mounted to revolve on a longitudinal shaft 101. The shaft 101 is indicated in Fig. 9 as mounted in post 99 and extending leftward through fixed bearings formed on the frame 54 and at its left extremity carrying a gear 102 which meshes with a smaller gear 103 loosely surrounding the longitudinal shaft 76, said gear in turn carrying a clutch member 104. See also Fig. 11. This train of connections operates only when the clutch is coupled, each operation serving to turn the spider through 90° to bring a new mandrel into operating line. Figs. 7 and 11 indicate the complementary clutch member 105, which constantly rotates and embodies electromagnetic clutch means controlled through circuits as will be described. The clutch member 105 may be keyed to the constantly turning longitudinal shaft 76, so that when the clutch magnets are excited the rotation of the shaft 76 is transmitted to revolve the carrier or spider.

The means by which the spider or carrier grasps and later releases each mandrel may be of any nature but is shown as magnetic in character. Thus each of the two arms of each of the four arc shaped receptacles 106 of the carrier is shown as wound with magnet coils 107 which have only to be energized to magnetize the receptacle and enable the spider to pick up and carry the light iron or steel mandrel. Thus in Figs. 4 and 7 the lowest mandrel 44 is not yet grasped by the carrier, as it is still coming into position. The mandrel 43 however is magnetically held in the front compartment of the carrier. The mandrel 42 has been so held and carried to the topmost position but has been magnetically released and thrust advancingly into operation. The controlling circuits will be later described.

The means of thrusting or starting each mandrel into operation by forcing it advancingly from the spider 100 into contact with the preceding mandrel may be as follows. The spider is shown as fitted with a plurality of thrusters or fingers 108 one for each compartment. The thruster shank 109 fits slidingly within a guide recess in the body of the spider, where it is squared to prevent rotation. A spring 110 is arranged normally to return the thruster toward the right into its idle position as seen in Figs. 4, 7 and 11. Any suitable means may be employed for forcing the thruster leftward at the proper moment to start the corresponding mandrel into action. Thus an electric coil or solenoid 111 is shown surrounding each shank 109. The shank should be constructed of iron for a certain distance into but not through the solenoid, to constitute a core, and beyond that point non-magnetic material such as brass should be used, so that when the solenoid is energized the shank 109 is pulled sharply leftward. The enlarged head of the thruster 108 is arranged to press against the right end of the mandrel and thrust it leftward into engagement with the pinch rolls of the first mandrel actuating mechanism 51.

The control of the mandrel in feeding operations may be effected by electric circuits, and the infeed of each mandrel controlled by the advance of the preceding mandrel into the position where it is about to discharge the first pinch roll actuator. Thus as shown in the drawings a drop contact 113 is shown resting on the active mandrel 42 closely adjacent to the pinch rolls. Fig. 12 shows the stage of operation where the mandrel is about to pass from under the drop contact or feeler 113. When this happens the contact will close the circuit between a pair of conductors 114 and 115, the latter being in circuit with a current source or battery 116, the other pole of the battery being indicated for convenience as grounded in the machine frame. The magnetic clutch 105 is shown controlled by a pair of brushes 118, resting on strips 119, and one brush is connected to the conductor 114, the other being grounded to complete the circuit; so that when the drop contact 113 falls the clutch is energized and the carrier 100 is thereby rotated a quarter turn to bring a new receptacle and mandrel in alinement with those in operation. The drop contact is lifted by the succeeding mandrel swinging up and into position, so that the clutch is deenergized and the carrier stopped by the new mandrel coming into alinement.

The holding magnets of the spider, and the mandrel thrusting solenoids, may be electrically controlled as follows. A commutator 120 is shown mounted on the carrier shaft 101. This may be a non-conducting cylinder having metallic conducting portions at its surface. Thus four pairs of commutator contacts 121 are shown properly spaced for the control of the four solenoids, to thrust each mandrel leftward into the pinch rolls when it is carried up into alinement therewith. Four sets of contact strips 122 are shown arranged for controlling the coils 107 of the holding receptacles or magnets 106 so that each one will be energized to pick up a mandrel from the conveyor and carry it to topmost position and there release it to be thrust forward to the actuator 51. Each pair of contacts 121 is in electric connection with one of the solenoids 111. Thus, a pair of wires 123 is shown extending from the topmost contacts to the topmost solenoid which is thereby energized to compress the spring 110 and move the thruster 108 to the left. A pair of brushes 124 is adapted to rest on the contacts in topmost position 121 and to pass from them as the commutator revolves, later on contacting another pair of such contacts. A pair of conductors 125 completes the circuit through the battery 116. Each pair of brushes 122 has conductors 127 to one of the holding magnets 106. A single pair of such conductors is shown and the others may correspond. A pair of brushes 128 is adapted to contact upon each pair of strips 122, and conductors 129 complete the circuit.

The timing of these several controls is indicated by the diagram in Fig. 12. When the passing of a mandrel allows contact 113 to drop, thus energizing the clutch magnet 105 the carrier or spider starts into rotation and continues for a quarter turn, thus bringing the succeeding mandrel to position. Before the quarter turn is completed the brushes 128 disengage the contact strips 122 of the uppermost receptacle, thus deenergizing the topmost magnet 106 and releasing the mandrel. As the contacts 121 reach the brushes 124, thus closing the circuit through the topmost solenoid, the thruster 108 is caused to move sharply to the left. This forces the topmost mandrel 43 advancingly to the left until it comes up into contact with the preceding mandrel 42 and engages the pinch rolls of the actuating mechanism, thus becoming an active mandrel and advancing helically to receive rubberized fabric.

The outfeeding devices of the mandrel circulating mechanism are best shown in Figs. 4, 7, 13 and 14. The outfeeding carrier or spider 140 is substantially like the infeeding carrier 100 and is mounted on a rotatable shaft 141, supported by a post 139 and frame 54, and provided at its right end with a gear 142 engaging a smaller gear 143 carrying a clutch member 144, these parts shown also in large scale in Figs. 9 and 15. Referring to Figs. 13 and 15 the complementary clutch member 145 is shown adjacent the clutch member 144, the former being fast on the constantly rotating shaft 76 and the latter loose except when the rotating clutch member 145 is magnetically energized as will be later described.

The carrier or spider is shown as formed with four arc shaped receptacles 146 each adapted to receive, hold and carry a mandrel, and the mandrel holding means of each receptacle is shown as consisting of electromagnet coils 147 wound upon the arms of each receptacle analogously to those of the infeeding carrier.

The controlling contact or feeler for energizing the clutch 145 so as to start the rotation of the spider 140 at certain times is shown mounted on a bracket 148 on post 139, and as comprising a member or bumper 149 arranged in the path of the outgoing mandrel 41 which it will be understood has been received in the topmost receptacle 146 in passing from the second actuating mechanism 52. When the foremost mandrel has been pushed so far as to strike the bumping contact 149 this will close an electric circuit and thus energize the spider revolving clutch. The bumping contact 149 is a part of a swinging arm which is held yieldingly in normal position by a spring 150. The arm carries an electric contact 151 cooperating with a second contact 152 so arranged that the swinging of the arm against the pull of the spring will close the contacts. A conductor 153 is shown extending from the contact 152 to a current source or battery 154, while a conductor 155 extends from the battery to one of a pair of brushes 156 running on contact strips 157 on the magnetic clutch 145. The circuit is completed by conductors 158 and 159 extending from the other brush back to the bumper or arm 149. When the advance of the foremost mandrel thus closes the described circuit the clutch will be energized and operate to rotate the spider, which thus carries the mandrel laterally out of the mandrel path and swings it down a quarter turn, while at the same time the preceding mandrel 46 will be swung clear down to the lowermost position where it is discharged upon the return conveyor 92. As the mandrel is swung away from the bumper 149 the spring 150 will cause the opening of the contacts 151, 152, which would release the magnetic clutch, but may be prevented by the commutator control about to be described.

The commutator 160 may be a cylindrical structure analogous to the commutator 120 already described. The surface of the commutator is shown provided with a series of four wide contact strips 161 controlling the magnetic driving clutch 145. For each of the holding magnets or receptacles 146 of the spider the commutator is provided with a pair of strips 162 as shown diagrammatically in Fig. 13, and shown separately in Fig. 14 to indicate the timing. A pair of conductors or wires 163 is shown extending across from conductor 153 to conductor 158 and connected with a pair of brushes 164 adapted to lie on one of the wide strips 161 of the commutator while the spider is in rotation, thus short circuiting the starting contact 151, 152. The foremost mandrel closes the last mentioned contact, thus starting the rotation of the spider and commutator. The brushes 164 lie normally between two of the strips 161 of the commutator so that this circuit is open, but as soon as the rotation commences, the circuit is closed as described and the rotation continues under control of the commutator until, after a quarter turn, the brushes arrive at the succeeding space between two strips. The friction and drag of the parts may be sufficient to bring them to rest upon the release of the magnetic clutch 145, but if desired an additional friction or brake could be employed, thrown into action when the clutch is released; and this observation applies to the driving and stopping of the spider 100 at the infeed end of the machine.

Each of the strip pairs 162 extends preferably for nearly a half turn of the commutator, as indicated in Fig. 14, and each pair is connected by a pair of wires 167 with the magnet coils 147 of one of the spider receptacles 146, so that when a pair of brushes 168 brings current to the strips this energizes the corresponding magnetic receptacle. The timing is such that the foremost mandrel 41, which in Fig. 14 has been received in the topmost receptacle and which has started actions by contacting the bumper 149, is magnetically gripped as the spider starts its rotation, the magnetism continuing as the receptacle and mandrel pass around rearwardly and downwardly a quarter turn, and again later for another quarter turn until they reach the lowermost position, when the brushes run off the corresponding strip and the mandrel is released and dropped upon the return conveyor 92. A pair of wires 169 is shown leading from each pair of brushes 168 to a pair of common conductors 170 leading to the two ends of the battery 154.

By the described mechanisms the successive mandrels are driven through the wrapping and cutting point, discharged, outfed laterally and deposited on the return conveyor, conveyed back, picked up, lifted into alinement with the wrapping and cutting axis, and forced into engagement with the operating or driving mechanism, so preserving a continuous mandrel surface for the wrapping and cutting, which surface advances and rotates with the rubberized stock.

It remains only to describe the web splicing and the strip cutting mechanisms, and the take-up means for the cut strips of bias ply. Between the first and second arched housings 54, 54 which contain the mandrel actuating mechanisms is shown a circular fixed housing 173 which contains the cutting mechanism and supports the splicing means, and has legs 174 with feet 175 secured to the base 55. Above the frame 173 is shown an arched bracket 176 which extends downwardly to where it carries the splicing roller or caster 48 which is shown bearing upon the contiguous edges of the convolutions of the rubberized fabric F being formed into a tube T. The compressing and uniting action is indicated in Fig. 8. See also Figs. 15 and 16. The lower part of the bracket is formed with a pair of fixed flanges or bearings 177. The roller is mounted in a fork 178 having a shank 179 sliding in bearings 177. A spring 180 is confined between the upper bearing 177 and a flange 181 on the support 178 so as constantly to press downwardly. It is desirable to hold the splicing roll firmly in the proper direction, in relation to the helical splice to be produced, and for this purpose a splined upper extension 182 of the shank slides in a threaded sleeve 183 turning in a recessed boss 184 and there locked by a lock nut 185 in its set position.

The mechanism for cutting the rubberized fabric helix or tube into bias plies is best shown in Figs. 15 and 17 in connection with the general views Figs. 4 and 7. As stated, preferably two cutters in the form of rotary blades or cutting disks 50 are employed so that two bias strips are simultaneously cut from the fabric tube, and preferably the cutting mechanism is bodily rotated in a plane at right angles to the axis of the fabric tube and mandrel; the operation being such as to produce a resultant helical cut in the fabric tube which will be opposite to or different from the helix in which the fabric is wound, and at such an angle thereto that the product will contain longitudinal fabric elements or cords at substantially 45° or between 35° and 55° to the length of the strip. The advancing speed of the fabric tube and its rate of rotation being known, the desired helix angle of the cut is obtained by setting the rotary speed of the cutter in relation to the movements of the fabric. For example with the proportions herein illustrated the cutting mechanism may be and is shown bodily rotated in the same direction as the rotation of the fabric tube, but at a considerably higher speed for example approximately three times the rotary speed thereof. In this way with a 56 inch width of rubberized fabric fed helically upon a mandrel about 112 inches in circumference the fabric tube can be cut into two bias plies each of about 14 inch width by means of a pair of opposite cutter disks bodily revolved at approximately three times the speed of rotation of the fabric tube. The cutting on the other hand may be at the opposite diagonal to that shown, making a helix trending in the same direction but at a different slant to that of the fabric web, in which case six or more cutters would have to be employed to give strips of the width mentioned, and the bodily revolution of the cutters would be at a speed more nearly that of, or slightly less than, the fabric tube and mandrel. However, as stated, the two cutter arrangement is shown.

For obtaining the cutting action the two opposite cutter units are shown as rotatably mounted within a revolving circular carriage 200 which is located within the circular fixed standard 173, the carriage having outwardly extending ribs or tracks 201 running upon a system of four pairs of flanged guide rollers 202 mounted on the frame 173. The bodily revolution of the cutter carriage 200 may be effected by means of a large bevel gear 204 formed or mounted at the right side of the carriage and having its teeth engaging with a bevel pinion 205 arranged on a short shaft which carries also a bevel pinion 206 engaging a bevel pinion 207 loose on a short shaft 208 journalled in the frame leg 174 at right angles to the axis of the machine. The bevel gear 207 carries a spur gear 209 engaging a larger gear 210, the shaft of which carries a smaller gear 211, engaging a larger gear 212 fast on the shaft 208. The described gearing 209—212 constitutes a multiplying gear to give faster speed to the cutter carriage, and the speed may be set as desired, by interchange of gears. The inner end of the shaft 208 carries a bevel pinion 213 engaging a bevel pinion 214 on the constantly rotating shaft 76. The proportions of the gearing from the shaft 76 to the pinch roll carriages 56 and to the cutter carriage 200, respectively, should be such as to give the desired speed relation, for example the latter to travel three rotations to one of the pinch roll carriage, so that the cutting will progress at three times the rotary speed of the winding and produce the desired helical cut.

Figs. 15 and 17 show two cutting units mounted in the carriage 200 and as these are alike it will suffice to describe one of them. The cutter 50 is shown as a small rotary disk mounted on a shaft 215 which also carries loosely a rubber faced pressure wheel 216 which bears and runs on the rubberized fabric F and holds it firmly to the mandrel at the cutting point. The shaft also carries a belt pulley 217. The shaft is mounted in a bearing sleeve 218 formed at the inner side of a small bracket or platform 219 which at its outer side carries an electric motor 220, the shaft of which is connected by a belt 221 with the pulley 217 on the cutter shaft. The motor is merely representative of any means of communicating rotation to the cutter disk in case it is desired to rotate it during operation, although if desired the cutter disk might operate simply by rolling contact against the fabric and mandrel, or for that matter might consist of a non-rotating blade or knife drawn along the fabric under pressure. When a motor is used there will be suitable brushes and rings to conduct the current thereto.

Figure 18:
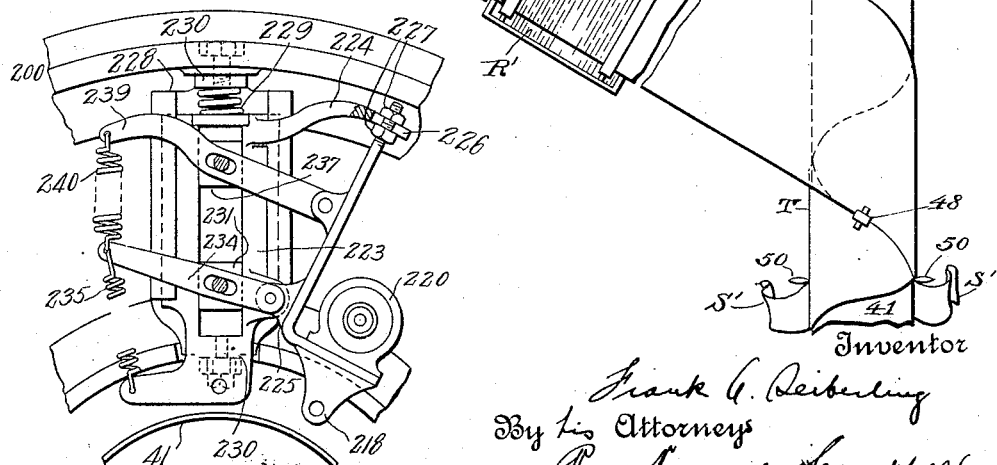
Fig. 18 is a detail view of certain elements of Figs. 15 and 17.

Each cutting unit may consist of the cutter disk 50 and connected devices, which may be so mounted on the rotary cutter carriage 200 that the cutter will bear upon the fabric tube and progressively sever a bias cut ply during the advance of the fabric tube. For illustration the bracket 219 carrying the cutter disk and motor is preferably mounted for inward or radial movement to permit resilient pressure to be applied to force the cutter through the fabric. These elements are shown supported at the inner end of a rigid L-shape bar 222. The bar 222 is connected at two points to a radially movable block 223. See Fig. 18. Thus an arm 224 extends rigidly from block 223 to the outer end of the bar, while its inner end has a hinge connection 225 to the block. A slot 226 in the arm 224 and nuts 227 on the bar give a tilting adjustment of the bar to set the knife to the mandrel. The block 223 is shown movable radially between dovetail guides 228 mounted on the rotary cutter carriage. All of these described parts are thus movable radially toward the fabric tube and mandrel and a strong spring 229 is shown pressing radially inward upon the block 223 so as to maintain the required cutting pressure. As indicated in Fig. 15 the cutter shaft and disk are set at an angle to the longitudinal axis, so that the cutter will turn in a plane which coincides at the cutting point with the direction of the desired helical cut. The cutter and motor may be swivelled on the bar 222 for this purpose, but it is preferred to swivel the entire system, and the dovetail guide block 228 is shown in Fig. 15 as swivelled above and below, at 230, to the wall of the rotor or carriage 200.

In Fig. 1 the cut plies P are shown extending loosely outward from the cutting point but in practice it is preferable to receive or wind each severed strip upon a take-up means. The following is shown as illustrative. A block 231 is arranged to slide radially in a guide or slot formed in the block 223 which in turn slides radially in the dovetail guides 228. The block 231 gives support to a rotary idler roll 232. Between the roll 232 and the mandrel is shown a reversing roll 233 mounted on an extension of the block 223. At the start the fabric strip is threaded around the roll 233 and thence around the idler roll 232 as indicated in Figs. 15 and 17. The rolling action of the reversing roll operates frictionally to drive the idler roll. The idler roll is constantly pressed radially inward through a lever 234 connected at one point to the slide block 231 and at its outer end pulled inward by a spring 235.

In case it is desired to apply a strip of sateen or other lining material between the convolutions of the rubberized strip there is shown a second slide block 237 supporting a liner spool 238 which supplies the liner progressively to the fabric strip, a lever 239, pulled upon by a spring 240, serving to effect radial inward pressure upon the liner spool.

The take-up roll or spool 242 may be spaced away from the described rolls to give room for expansion, and its axle is shown mounted on a block 243 movable radially in a guide 244 on the carriage 200, with a spring 245 pressing inwardly on block 243 to hold the expanding surface of the wound bias strip in contact against a pair of bearing rollers 246. The coiled strip may be surface driven by a roll 247 mounted on a spring pressed lever 248 to give driving friction, and the drive roll 247 mounted in turn may be rotated frictionally by a roll 249 which receives its rotation by rolling around the surface of the fabric tube T on the mandrel. In starting, the fabric strip may be threaded through and started upon the take-up spool 242 in a manner to leave some slack between the idle roll and the take-up to allow for differences in angle, with guide means to keep the strip to its path.

As the bias cut strip is formed it builds up upon the take-up spool, and when a considerable quantity of strip has been produced, the product may be removed from the machine by severing the strip adjacent to the take-up position, and removing the take-up spool and coiled strip, and again starting the strip for continued operations; and the general rotation may be briefly slowed down or suspended for these operations. The capacity of the take-up means may be increased by enlarging the dimensions, or otherwise, the illustrated means sufficiently illustrating the principles.

Many variations of all branches of the process and machine are admissible, in addition to those already suggested. For example, fewer circulating mandrels could be used, as few as two; and the terms series or succession include a system of two mandrels, which will serve by relatively elongating them to prolong the engagement of each with the actuators and so give the other time to be circulated, or by giving to the first pinch roll set a faster drive than the second, with slippage. The rubberizing or calender apparatus may be synchronized with the wrapping mechanism otherwise than by direct gear connection as shown, and its speed might be slightly varied, under control of an idler or tension pulley between the two units, so as to maintain a traveling supply of fabric under a uniform tension to the mandrel, and correcting any loss of coordination. The fabric tube, with its helical cords or threads, may be formed in different ways before the cutting; and the cutting may be in different paths so long as it is on a bias or slant to the cords or threads; for example the cutting may be circular, to produce bias cut rings of proper size to apply in the building of a tire. These and other modifications are intended to be included in the present invention.

It will thus be seen that there has been illustratively described a novel method and machine for producing bias strips or plies which embody the principles and attain the objects of the present invention; but as various matters of operation, construction, arrangement, combination and detail may be largely modified without departing from the principles it is not intended to limit the invention to such matters except so far as specified in the appended claims.

What is claimed is:

1. Apparatus for the continuous production of bias strips of indefinite length comprising means for supplying a preformed web of fabric from a lateral and relatively stationary supply position and advancing it inclinedly to the wrapping point, means for progressively wrapping such fabric web helically into tube form and advancing such tube longitudinally while rotating it, and means for progressively causing the contiguous edges of the fabric web to unite.

2. Apparatus for the continuous production of bias cut strips of indefinite length comprising means for supplying a web of preformed fabric from a lateral supply position and advancing it to the wrapping point, means for progressively wrapping such fabric web helically into tube form while helically advancing it, means for progressively cutting such advancing fabric tube into a strip or strips diagonally to the length of the fabric web, and means for continuously taking up the resulting strip or strips.

3. Apparatus for the continuous production of bias cut strips of indefinite length comprising means for supplying a web of preformed fabric from a lateral supply position and advancing it to the wrapping point, means for progressively wrapping such fabric web helically into tube form, and means for progressively cutting such advancing fabric tube into a bias strip or strips along a path or paths extending helically about the tube and intersecting the helical path of wrapping.

4. A machine for producing bias strips of indefinite length comprising supply means for supplying a web of fabric from a stationary supply position and delivering it to the wrapping point, and means for progressively helically wrapping the fabric web continuously into a tube and advancing such tube helically to an indefinite extent.

5. A machine for producing bias strips of indefinite length comprising supply means for supplying a web of fabric from a stationary lateral supply position and delivering it to the wrapping point, means for progressively wrapping the fabric web helically into tube form and advancing such tube helically, comprising a mandrel system movable forwardly only, means for progressively cutting the advancing tube into a strip or strips diagonally to the length of the fabric, and means for taking up the same.

6. A machine for producing bias strips of indefinite length, comprising means for supplying a web of fabric from a lateral supply position and delivering it to the wrapping point, means for progressively wrapping the fabric web helically into tube form and advancing such tube helically, and cutting means for progressively slitting the advancing fabric tube into a bias strip or strips, such cutting means having means for bodily revolving it about the tube whereby it may operate along a path or paths extending helically about the tube in a direction substantially different from the length of the web.

7. A machine for producing bias strips of indefinite length comprising means for supplying a web of fabric from a lateral supply position and delivering it to the wrapping point, and means for progressively receiving and wrapping the fabric helically into a tube of indefinite extent and advancing such tube helically comprising a mandrel system movable only forwardly and rotatingly.

8. A machine for producing bias strips of indefinite length comprising means for supplying a web of fabric from a stationary lateral supply position and delivering it to the wrapping point, means for progressively receiving and wrapping the fabric helically into tube form and advancing such tube helically, and means for progressively uniting the contiguous edges of the fabric, comprising a splicing device maintained in fixed location so as to follow the helical path of the fabric seam as the tube progresses helically.

9. A machine for continuously producing bias strips of indefinite length comprising a mandrel having means for helically advancing its receiving surface, and means for supplying and guiding a preformed fabric web to be wrapped upon the mandrel.

10. A machine as in claim 9 and wherein are means for bias cutting the fabric upon the mandrel, the same located beyond the wrapping point and comprising a cutter bearing directly against the mandrel, and revolved about it to produce a diagonal cut.

11. A machine for continuously producing bias strips of indefinite length comprising a cylindrical mandrel system having means for indefinitely advancing it helically and means for supplying fabric to be wrapped upon the mandrel.

12. A machine as in claim 11 and wherein the mandrel advancing means comprises pinch rolls bearing on the mandrel and means rotating the pinch rolls to advance the mandrel, a carriage carrying the pinch rolls, and means revolving the carriage to rotate the mandrel.

13. A machine as in claim 11 and wherein the mandrel advancing means comprises a revolving carriage, pinch rolls on the carriage engaging the mandrel, planet gears driving the rolls, and a fixed gear on which said planet gears run to rotate the rolls in time with the carriage to deliver a helical advance to the mandrel.

14. A machine for continuously producing bias strips of indefinite length comprising a fabric web receiving mandrel having means adapted for endlessly helically advancing its receiving surface, and means for supplying fabric web to be wrapped as a tube upon the mandrel, and means for detaching the tube in the form of a bias strip or strips.

15. A machine for producing bias strips of indefinite length comprising a series of successive mandrels having means operating successively thereon to rotate and advance each mandrel through the wrapping position, and means receiving the outgoing mandrels and returning each of them and feeding it to the mandrel operating means.

16. A machine for producing bias strips comprising a series of separate mandrels, means operating successively thereon to advance the mandrels through the wrapping position in end to end engagement, and circulating means receiving each of the outgoing mandrels and returning and feeding it to the mandrel operating means.

17. A machine as in claim 16 and wherein the circulating means comprises an outfeeding device receiving each mandrel from the operating means and carrying it laterally to the conveying device, a conveying device receiving each outfed mandrel and conveying it reversely to the infeeding device, and an infeeding device receiving each mandrel and carrying it laterally into operating line.

18. A machine for producing bias strips comprising a series of successive mandrels, operating means successively advancing the mandrels through the wrapping position, means for supplying fabric web to be wrapped thereon, means for bias cutting the fabric web wrapped thereon, an outfeeding device beyond the cutting position, a reconveying means between outfeeding and infeeding devices, and an infeeding device delivering reconveyed mandrels to the operating means.

19. A machine as in claim 18 and wherein the outfeeding device comprises a carrier receiving each of the mandrels discharged from the operating means, and means shifting the carrier to carry each mandrel laterally to the reconveying means.

20. A machine as in claim 18 and wherein the outfeeding device comprises a carrier receiving each of the mandrels discharged from the operating means, and means shifting the carrier to carry each mandrel laterally to the reconveying means, said shifting means being controlled by a contact device from the mandrel itself.

21. A machine as in claim 18 and wherein the outfeeding device comprises a carrier receiving each of the mandrels discharged from the operating means, and means shifting the carrier to carry each mandrel laterally to the reconveying means, comprising an intermittent clutch actuating the carrier, and a contact operated by the mandrel for controlling the clutch.

22. A machine for producing bias strips comprising a series of successive mandrels, operating means successively advancing the mandrels through the wrapping position, means for wrapping and bias cutting the fabric wrapped thereon, an outfeeding device beyond the cutting position, a reconveying means between outfeeding and infeeding devices, comprising a longitudinal belt conveyor below the wrapping position and means actuating it, and an infeeding device delivering reconveyed mandrels to the operating means, comprising means for stopping the reconveyance of each mandrel.

23. A machine for producing bias strips comprising a series of successive mandrels, operating means successively advancing the mandrels through the wrapping position, means for wrapping and bias cutting the fabric wrapped thereon, outfeeding and reconveying means for discharged mandrels, and an infeeding device delivering reconveyed mandrels to the operating means, comprising a laterally shifting carrier taking each mandrel and carrying it into operating alinement and having means thrusting the alined mandrel advancingly into the operating means.

24. A machine as in claim 23 and wherein is actuating means for the carrier and means controlled by the advance of the previous mandrel for causing the actuating means to shift the carrier.

25. A machine as in claim 23 and wherein is actuating means for the carrier and means controlled by the advance of the previous mandrel for causing the actuating means to shift the carrier, consisting of a feeler or contact held out of normal by each advancing mandrel until released by the mandrel, and becoming reset by the shifting of the succeeding mandrel, into position.

26. A machine as in claim 23 and wherein the mandrel thrusting means comprises a finger, mounted on the carrier, acting as a positioning stop for each reconveyed mandrel, and thereafter actuated to force each mandrel into engagement with the operating means.

27. A machine as in claim 23 and wherein one or both of the outfeeding and infeeding devices comprises a rotary carrier having a plurality of holders, adapted to shift step by step and to grip each mandrel and subsequently release it.

28. A machine as in claim 23 and wherein one or both of the outfeeding and infeeding devices comprises a rotary carrier having a plurality of holders, adapted to shift step by step and to grip each mandrel and subsequently release it; with a general controller or commutator timing the grip and release of each holder with the step by step advance thereof.

29. A machine as in claim 23 and wherein one or both of the outfeeding and infeeding devices comprises a rotary carrier having a plurality of holders, adapted to shift step by step and to grip each mandrel and subsequently release it; with a general controller or commutator timing the grip and release of each holder with the step by step advance thereof, and the redelivery of the mandrels to the operating means.

30. A machine for continuously producing bias strips of indefinite length comprising a mandrel having means for helically advancing its receiving surface, means for supplying preformed fabric web to be wrapped helically upon the mandrel, and means for progressively uniting the contiguous edges of the fabric web upon the mandrel; said uniting means comprising a presser acting against the mandrel and arranged in fixed position to follow a helical path on the wrapped fabric.

31. A machine for continuously producing bias strips of indefinite length comprising means for progressively wrapping fabric into helical tube form and advancing such tube, and means for progressively bias cutting the wrapped tube into strip form along a path or paths extending helically about the tube, comprising a cutter, a cutter carriage, and means revolving the carriage to carry the cutter around the tube at such rotary speed as to produce a cut at a predetermined diagonal to the length of the fabric.

32. A machine for continuously producing bias strips of indefinite length comprising means for progressively wrapping fabric into tube form and helically advancing such tube, and means for progressively bias cutting the wrapped tube into strip form comprising a disk cutter. and means positively rotating the cutter, while revolving the cutting means about the tube.

33. A machine for producing bias strips comprising means for progressively wrapping fabric into tube form and helically advancing such tube, and means for progressively bias cutting the helically wrapped tube into strip form, and take-up means for the bias strip comprising a take-up spool bearing toward the fabric tube, and a pressure roll between the spool of bias strip and tube.

34. A machine for continuously producing bias strips of indefinite length comprising means for progressively wrapping fabric helically into tube form and helically advancing such tube, and means for progressively bias cutting the wrapped tube into strip form for revolving the cutting means about the tube during cutting, and take-up means adjacent the cutting means and revolving synchronously with it.

35. In a machine for continuously producing bias strips of indefinite length, means for supporting and helically advancing a fabric tube endlessly, means for supplying fabric web to form such tube and means for helically slitting the tube into a bias strip or strips.

In testimony whereof, I have affixed my signature hereto.

FRANK A. SEIBERLING.